United States Patent [19]
Tait et al.

[11] Patent Number: 5,550,358
[45] Date of Patent: Aug. 27, 1996

[54] NON-CONTACTING TRANSACTION SYSTEM

[76] Inventors: Robert A. R. Tait; Elizabeth M. Tait, both of 5 Bridgecastle Gardens, Westfield, Bathgate, West Lothian, EH48 8DU, United Kingdom

[21] Appl. No.: 392,023

[22] Filed: Feb. 21, 1995

Related U.S. Application Data

[63] Continuation of Ser. No. 94,182, Aug. 2, 1993, abandoned.

[30] Foreign Application Priority Data

Jan. 31, 1991 [GB] United Kingdom ............... 9102104

[51] Int. Cl.$^6$ ................................................. G06K 5/00
[52] U.S. Cl. ...................... 235/380; 235/379; 235/382
[58] Field of Search ................................. 235/379, 382, 235/375, 380, 472, 381

[56] References Cited

U.S. PATENT DOCUMENTS

| | | | |
|---|---|---|---|
| 4,189,712 | 2/1980 | Lemelson | 235/382 |
| 4,224,666 | 7/1980 | Giraud . | |
| 4,236,068 | 11/1980 | Walton | 235/380 |
| 4,277,837 | 7/1981 | Stuckert . | |
| 4,345,146 | 8/1982 | Story et al. | 235/381 |
| 4,454,414 | 6/1984 | Benton . | |
| 4,501,958 | 2/1985 | Glize et al. . | |
| 4,523,087 | 6/1985 | Benton . | |
| 4,601,011 | 7/1986 | Grynberg | 364/900 |
| 4,625,276 | 11/1986 | Benton et al. . | |
| 4,757,185 | 7/1988 | Onishi | 235/375 |
| 4,800,543 | 1/1989 | Lyndon-James et al. | 368/10 |
| 4,967,366 | 10/1990 | Kaehler | 235/381 X |
| 5,113,183 | 5/1992 | Mizuno et al. | 235/382 X |

FOREIGN PATENT DOCUMENTS

| | | |
|---|---|---|
| 0114447 | 1/1983 | European Pat. Off. . |
| 0159539 | 3/1985 | European Pat. Off. . |
| 85/00395 | 7/1985 | European Pat. Off. . |
| 0174016 | 3/1986 | European Pat. Off. . |
| 86/03869 | 7/1986 | European Pat. Off. . |
| 0402182 | 2/1990 | European Pat. Off. . |
| 2624677 | 12/1987 | France . |
| 57-174785 | 10/1982 | Japan . |
| 59-72583 | 4/1984 | Japan . |
| 1290095 | 11/1989 | Japan ............................ 235/380 |
| 3198191 | 8/1991 | Japan ............................ 235/380 |
| 1219123 | 1/1968 | United Kingdom . |
| 2192665 | 1/1988 | United Kingdom . |
| 8603869 | 7/1986 | WIPO . |

OTHER PUBLICATIONS

HP48SX Scientific Expandable, Owner's Manual vol. II, Edition 2, Apr. 1990, pp. 619–620.

*Primary Examiner*—Donald T. Hajec
*Assistant Examiner*—Jeffrey R. Filipek
*Attorney, Agent, or Firm*—Bell, Seltzer, Park & Gibson, P.A.

[57] ABSTRACT

A remote wireless transaction system has a hand-held transmitter which contains a digital memory device storing information unique to the user. The transmitter has a keypad to allow the user to key-in a unique PIN number, this PIN number also being stored in the transmitter. If the keyed-in PIN number corresponds to the stored PIN number the transmitter transmits the stored, user-unique, information. The system also includes a receiver which is arranged to receive the transmitted information and to log that information in a receiver memory. If the receiver information correlates with a valid user the transaction is completed. Communication between the transmitter and the receiver is exclusively one-way.

19 Claims, 7 Drawing Sheets

NON-CONTACTING TRANSACTION SYSTEM

This application is a continuation of application Ser. No. 08/094,182, filed as PCT/GB92/00181, Jan. 31,1992 published as WO92/14222, Aug. 20, 1992, now abandoned.

The present invention relates to apparatus for logging data of transactions and particularly, but not exclusively, the invention relates to apparatus for recording cashless financial transactions.

BACKGROUND OF THE INVENTION

It is now widely accepted that purchasing goods or services in the domestic sector is more efficiently carried out if the purchase transaction does not use cash. Cash is often perceived as, at best, cumbersome and, at worst, an unnecessary risk to personal safety, for example, from muggings and also financially, from theft. Current trends are to move towards a "cashless society" and the momentum of this trend is gaining the support nationally and internationally.

The existence of credit cards goes quite a long way to meet the ideal requirements in respect of cashless transactions. For example, it contains the owner's identity number imprinted on a magnetic strip on the back of the card, together with the owner's name embossed on the front of the card. A holograph of the owner's signature is written on the back of the card and is the only means of confirming the correct ownership of the card. Nevertheless, the present type of credit card has severe limitations in providing the ideal solution for a cashless transaction. For such a transaction to commence, the credit card must physically come into contact with either a paper voucher on which the embossed details are transferred by carbon copy or the card must be physically passed through a swipe machine so that the magnetic strip is electro-magnetically read by a magnetic head. Both of these techniques require intimate physical contact of a machine with a credit card. The next step in the transaction is for the owner of the credit card to append his signature on the paper voucher. The vendor in the transaction compares, or should compare, the signature on the back of the card with that on the voucher. Assuming that there is a fair degree of resemblance between the signatures, the vendor then accepts that the transaction is complete. In order for the card owner's account to be debited, the vendor either sends copies of the carbon slips to the credit card company or the information from the magnetic swipe reader is electronically stored and usually transmitted over a telephone link. In the former case, one of the problems is loss of credit card slips or even damage to the slips such as to render details of the credit card unusable, with the result that the owner's account does not get debited and this results in a loss to the vendor. In the case of a card swipe machine, the information is periodically scanned from a central computer which polls all the swipe machines to which it is linked and the details of the transaction are then fed to a central storage location where the information is then entered into the user's account and a bill is then prepared and sent to the user.

One problem with the existing system is that card fraud is very easily perpetrated. This is mainly because the signature appears on the reverse side of the card. A signature can generally be perfected by repeated copying so that it appears similar to that on the card. The unauthorised user of the card can then forge the signature to complete a fraudulent transaction. Even is a stolen or lost card is reported, there is often considerable time before all premises and businesses accepting that type of card are notified. In the case of a swipe card, notification is carried out remotely and periodically over the telephone line. Nevertheless, a professional criminal is able to verify whether the card is still valid with minimal risk and to use the card on a day-to-day basis with minimal risk of being apprehended.

A further disadvantage of existing credit card systems is that it is not possible to use the card without physical contact. Therefore, it is not presently feasible to use a credit card for parking, for paying tolls on a toll road or bridge or the like and in such situations, cash is still the preferred method of payment.

OBJECT AND SUMMARY OF THE INVENTION

An object of the present invention is to obviate or mitigate at least one of the aforementioned disadvantages.

This is achieved by providing a hand-held transmitter which contains information unique to the user and which, when actuated by the user, generates a wireless signal which is picked up by a receiver. In a preferred arrangement, the transmitter contains the user's code and has a keypad for the user to insert a personal identification number (PIN) code. The receiver is coupled via a transmission line to a local system where the user's code and PIN number and details of the purchase, received from the vendor, are registered against the user's number so that billing can be carried out subsequently.

The receiver can include a means for checking and for rectifying the correctness of the code and PIN number prior to transmitting the data via the modem to the central system. The device is flexible and the PIN number could be required for all transactions to minimise fraud. Each transmitter may be provided with a terminal to allow an input to the memory for changing details of the user's account and charge number. To prove ownership of the transmitter, the owner's name, telephone number, car registration number etc. may also be fused in the memory along with the credit card number. This information would be displayed only to the vendor who could ask the person who was using the transmitter to identify himself by name, PIN, telephone number or car registration as proof of identity.

An object of the present invention is to obviate or mitigate at least one of the aforementioned disadvantages.

According to one aspect of the present invention, there is provided a non-contacting transaction system comprising, transmitter means having a memory for storage of data identifying the user therein, and a transmitter for transmitting the stored data to a remote location upon actuation of the transmitter means by the user, and receiver means for receiving the transmitted data and having indicator means for indicating that the data transmitted is received and that the transaction can proceed.

Preferably, the transmitter means includes a keypad for the user to insert details of a PIN number. Conveniently, the transmitter means includes a terminal coupled to said memory whereby the transmitter can be coupled to a control means whereby the information in said memory may be changed or supplemented.

The transmitter includes a switch actuatable by the user which results in the stored data being continually transmitted or transmitted in bursts during the transmitting actuation.

Conveniently, the receiver may be coupled by a modem or the like over the telephone network to a central data processing and storage unit where details of the transactions are allocated to the user's account for subsequent billing.

Alternatively, the receiver may include disk storage means or other suitable mass storage means for storing validated transactions for subsequent despatching of the stored transaction data to the central data processing and storage unit at a later date.

Conveniently, the receiver includes a display for displaying to the vendor the transmitted information. Advantageously, the receiver includes parity and code check means for rectifying the correctness of the received code prior to transmitting it to the modem.

According to another aspect of the invention, there is provided a transmitter for use in a non-contacting transaction system, said transmitter comprising a memory for storing data identifying the user, a transmitter coupled to the memory for wireless transmission of said stored data to a remote location, and switch means actuatable by the user for causing said stored data to be transmitted.

Preferably, the transmitter includes a keypad for the user to insert details of a personal identification number (PIN), and said data being transmitted only if the correct PIN number is keyed in.

Conveniently, the transmitter includes a terminal coupled to the memory whereby the transmitter can be coupled to a control means to change the information in said memory.

Preferably also, the transmitter includes a plurality of keys representative of different user accounts and the user can nominate which account a transaction is to be attributed to by selecting the appropriate key.

The transmitter is an infra-red transmitter.

Alternatively, the transmitter may include a remote telephone console interfaced to said memory and keys whereby a user may remotely conduct a transaction using radio frequency communications or any part of the electro-magnetic spectrum for communications.

According to a further aspect of the invention, there is provided a receiver for use in a non-contacting transaction system, said receiver comprising a data receiver for receiving a wireless transmission, means for indicating that the data has been received, means for processing the received data for display, means for verifying the correctness of the data received, and display means for displaying to a vendor details of the user stored in said transmitter.

Preferably, the receiver is coupled to a card swipe machine. Conveniently, the receiver and/or card swipe machine are coupled to a cellular telephone network for receiving said data by radio frequency communication. Conveniently, the receiver may be coupled by a modem or the like over the telephone network to a central data processing and storage unit where details of the transactions are allocated to the user's account for subsequent billing.

Alternatively, the receiver may include disk storage means or other suitable storage means for storing validated transactions for subsequent despatching of the stored transaction data to the central data processing and storage unit at a later date.

Thus, the invention provides a considerable improvement over existing cash cards to satisfy requirements for cashless transactions. The invention permits cashless transactions to be performed in a non-contacting fashion and it provides a secure method of checking and verifying the identity of the vendor without requiring signatures.

BRIEF DESCRIPTION OF THE DRAWINGS

These and other aspects of the present invention will become apparent form the following description when taken in combination with the accompanying drawings in which.

DETAILED DESCRIPTION OF PREFERRED EMBODIMENTS OF THE INVENTION

Figure 1:
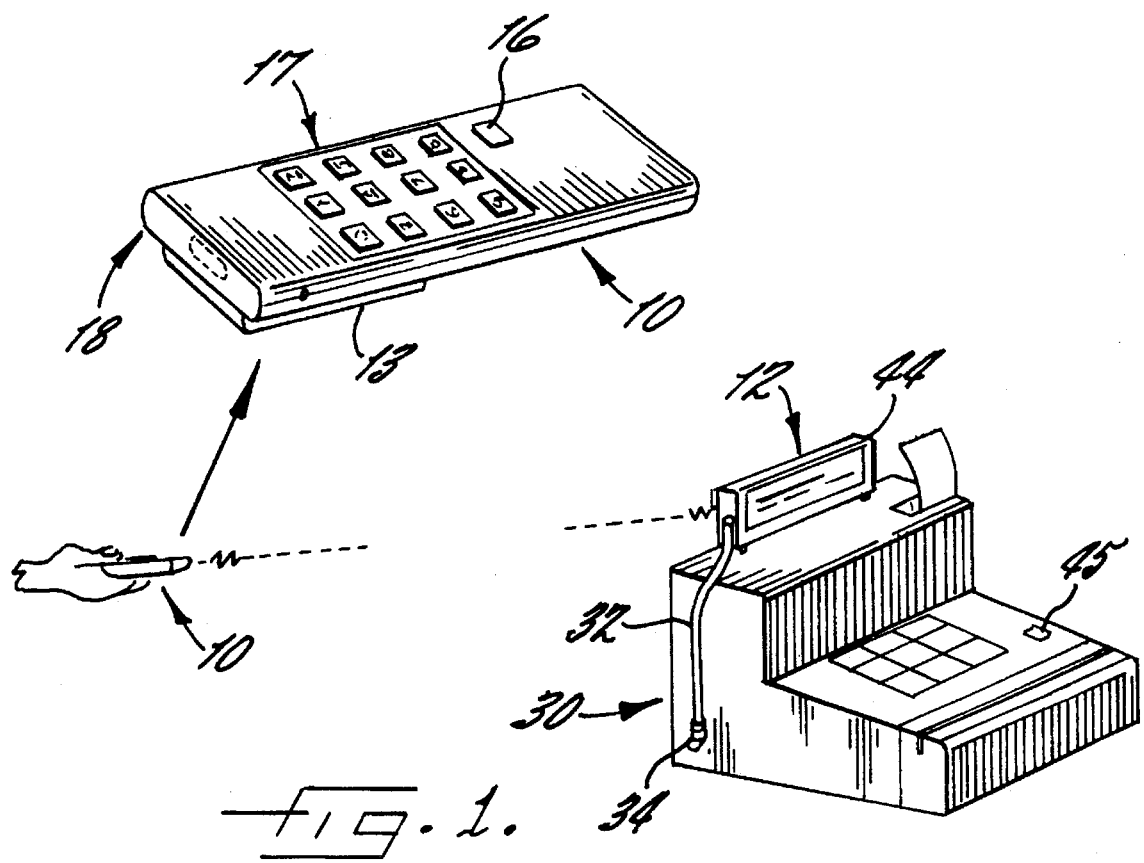
FIG. 1 is a diagrammatic view of a system consisting of a transmitter and a receiver shown coupled to a card swipe machine in accordance with one aspect of the present invention.

Reference is first made to FIG. 1 of the drawings which depicts a hand-held transmitter 10 and receiver 12 in accordance with the first embodiment of the invention. As will be later described in detail, the transmitter 10, when actuated, transmits information about the user which is received by the receiver 12 and used to initiate the transaction. The transmitter is about 10 cm long and has a clip 13 for securing in a pocket or the like. The transmitter has a switch 16 and an infra-red filter 18 at one end of the transmitter. The transmitter also has a keypad 17 which enables high value transactions to be carried out by combining the stored credit card or account number with a personal identification number (PIN).

Figure 3A:
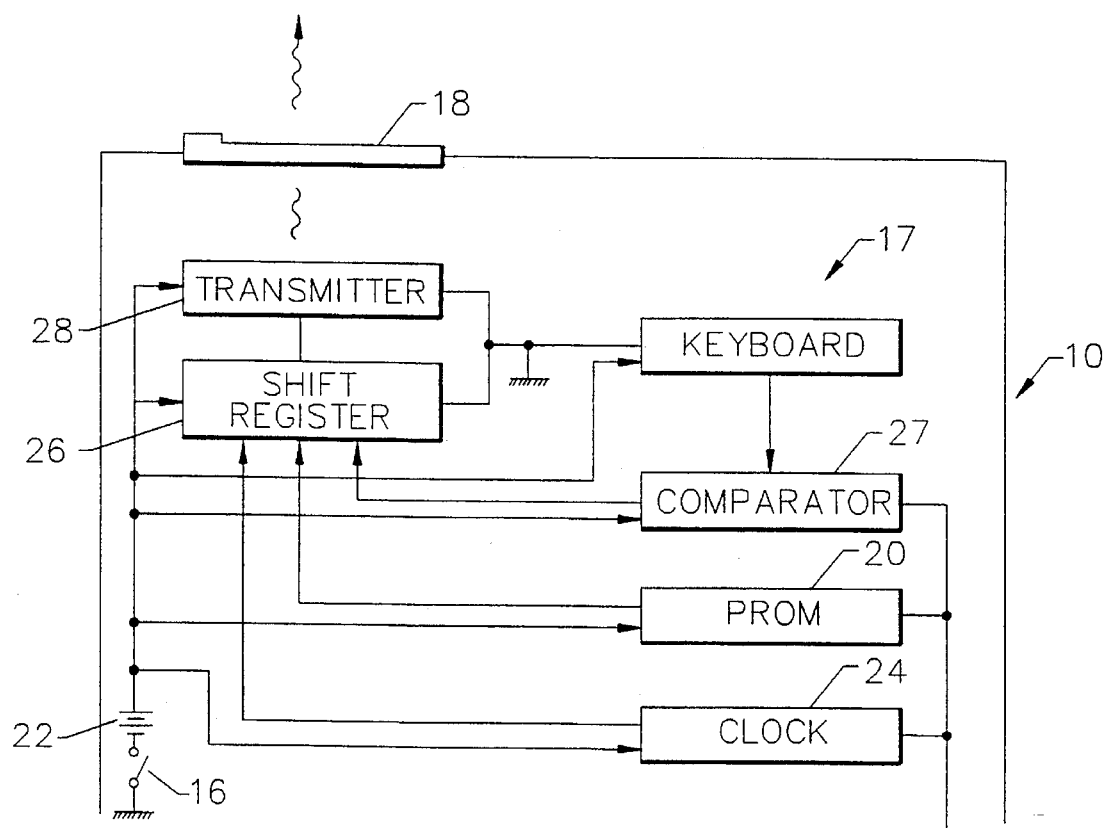
FIGS. 3a and 3b are schematic block diagrams of the transmitter and receiver, respectively shown in FIG. 1.
Figure 3B:
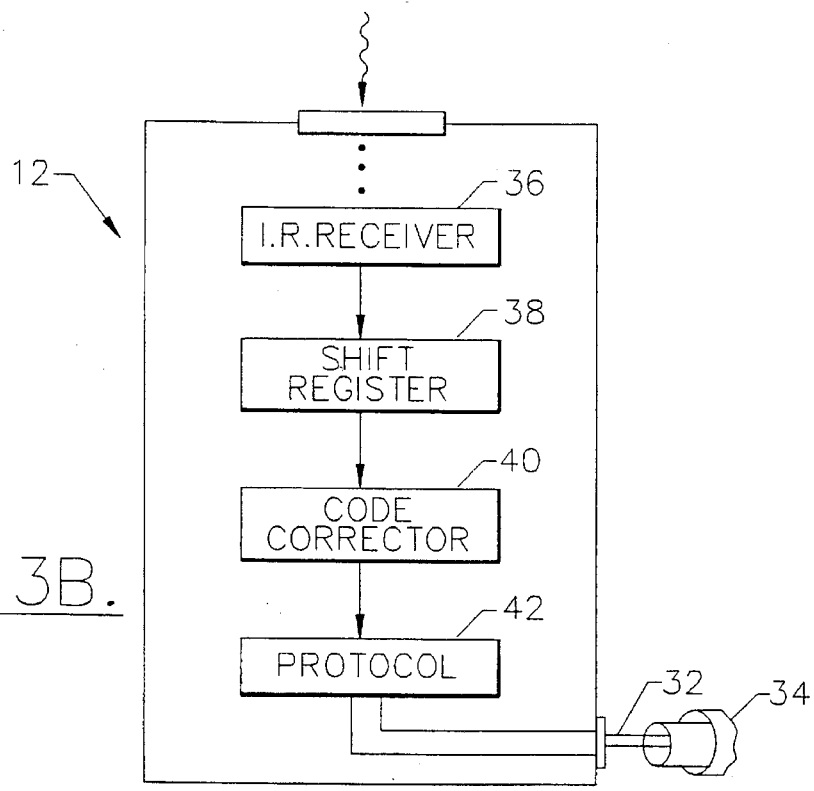
Figure 6:
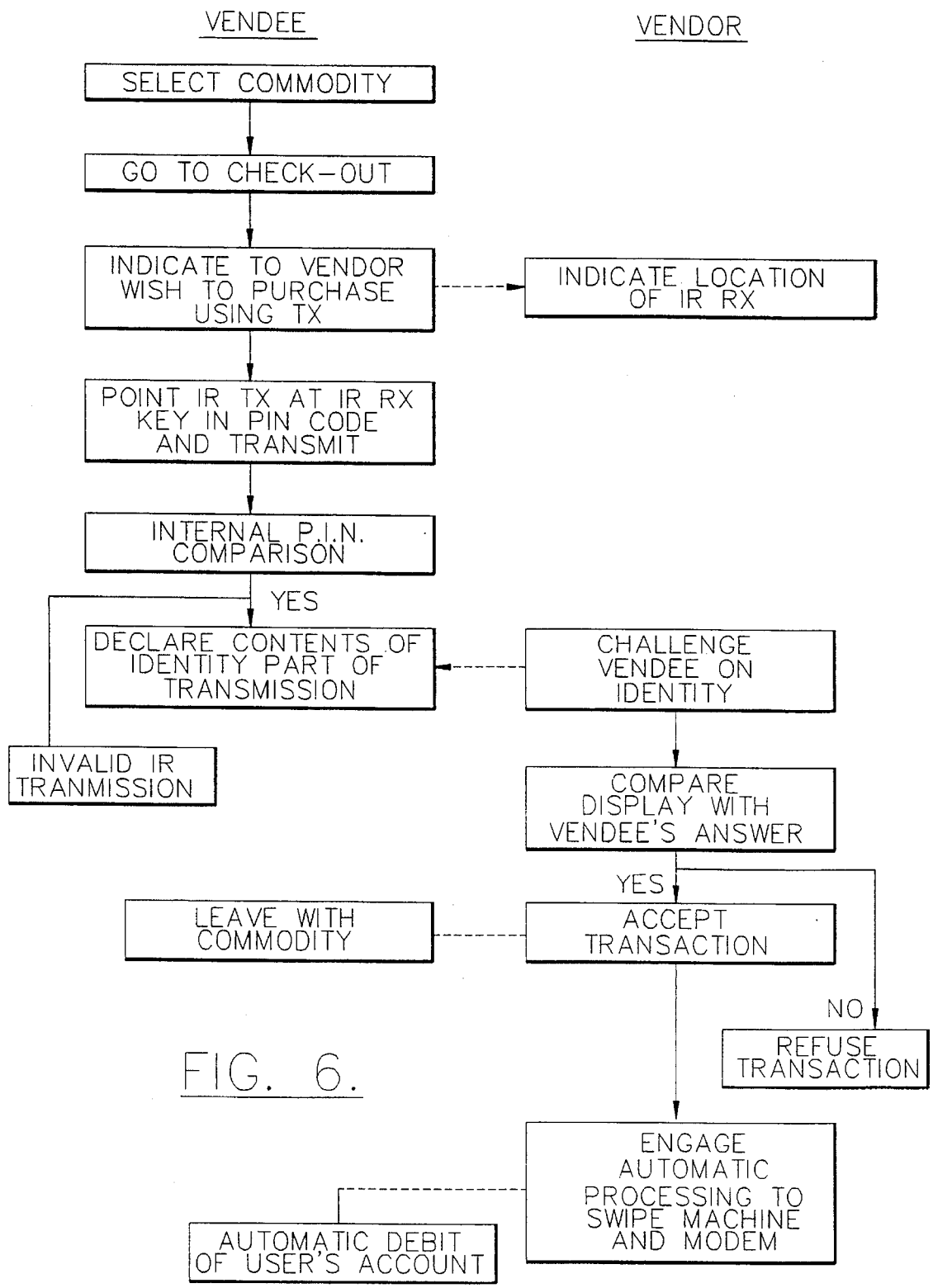
FIG. 6 depicts a flow chart of the operation of the transmitter and receiver conducted by a user in the pursuit of purchasing a commodity using the transmitter and receiver shown in FIG. 1.

Reference is also made to FIGS. 3a, 3b and FIG. 6 of the drawings which are a schematic block diagram of the transmitter and receiver circuits and a flow chart of the operations involved in a transaction using the transmitter/receiver arrangement of FIG. 1. The transmitter 10 contains a programmable read only memory (PROM) chip 20 in which the owner's personal credit number (i.e. similar to a credit card number or bank number etc.) is electronically stored. The owner's name or other identifying number such as vehicle registration number or community charge number, is also stored. When the switch 16 is depressed, power is applied to the circuit from the battery 22 and the information contained in the PROM 20 is only transferred in parallel using the clock 24, to the shift register 26 only if the correct PIN number is inserted via the keypad 17. The keyed-in PIN number is compared in comparator 27 with the fused PIN number, and only if they match is the information transferred to shift register 26. The identity part of the fused data, for example, the vendee's name or community charge number or driving licence number, can be checked as previously mentioned. This further improves the security as the PIN number is known only to the user and will provide at least the same level of security as with a bank charge card for use with High Street terminals and the like. the information received in the shift register 26 is then transferred to the infra-red transmitter 28, in serial form, and clocked by the clock 24 for transmission. The infra-red filter 18 is a notch filter selected to best suit infra-red transmission.

Thus, in practice, the vendee or user can transfer his personal credit details in a non-contacting, remote fashion in the infra-red waveband. Of course, it will be appreciated that transmission might be in any suitable part of the electromagnetic spectrum, not necessarily at infra-red wavelengths.

The transmitted data is received by the receiver 12 which is coupled to a conventional card swipe machine 30 by a cable and connector 32,34 respectively. As best seen from the receiver schematic block diagram in FIG. 3b, the data is received by a suitable infra-red receiver 36 in serial form and the receiver then assembles the data into parallel format for the shift register 38. The parallel data is checked for parity in the code corrector 40 and any precoded format of data using a protocol circuit 42 prior to being transferred to the card swipe machine 30.

Thus, the information in the transmitter is passed from the transmitter to the receiver and then to the card swipe machine without contact or from suffering from the aforementioned disadvantages.

The operation of the system in a cashless transaction is best described with reference to the flow chart shown in FIG. 6 of the drawings. The receiver 12 on the card swipe machine has a display panel 44 which displays the contents of the identity part of the message, for example, the name of the user or vendee once the transmission is complete. Provided that the display panel 44 is out of sight of the vendee, the vendor can read the identity part of the message and verify with the vendee as to the contents of this part of the message, as shown in step 8 of FIG. 6. Assuming that the vendee is the owner of the transmitter, only he knows the detail of the identity part of the message and can give the correct answer. This can be readily checked by the vendor by simply comparing the answer with that displayed on the panel; step 9. If the vendor is satisfied of the user's identity, he then authorizes the transaction to proceed by actuating a button 45 on the card swipe machine which accepts the user's transmitted data; step 10. Of course, if the vendee is not the owner of the transmitter, then the vendor can terminate the transaction, step 13. If, in fact, the vendee is not the owner of the transmitter, then only access to sophisticated electronic equipment would be required to interrogate the transmitter to enable misuse of the transmitter. Although this is, in theory, possible it is most unlikely that this facility would be available to criminals to carry out widespread fraud and the security achieved is far superior to that of comparing signatures.

Figure 2:
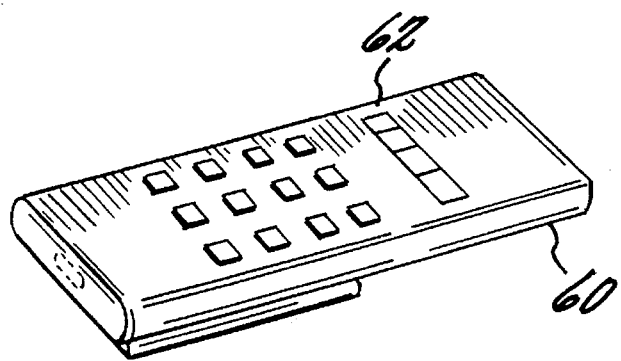
FIG. 2 is a diagrammatic view of an alternative transmitter similar to that shown in FIG. 1 and which includes a keyboard and a set of credit card select buttons.
Figure 4:
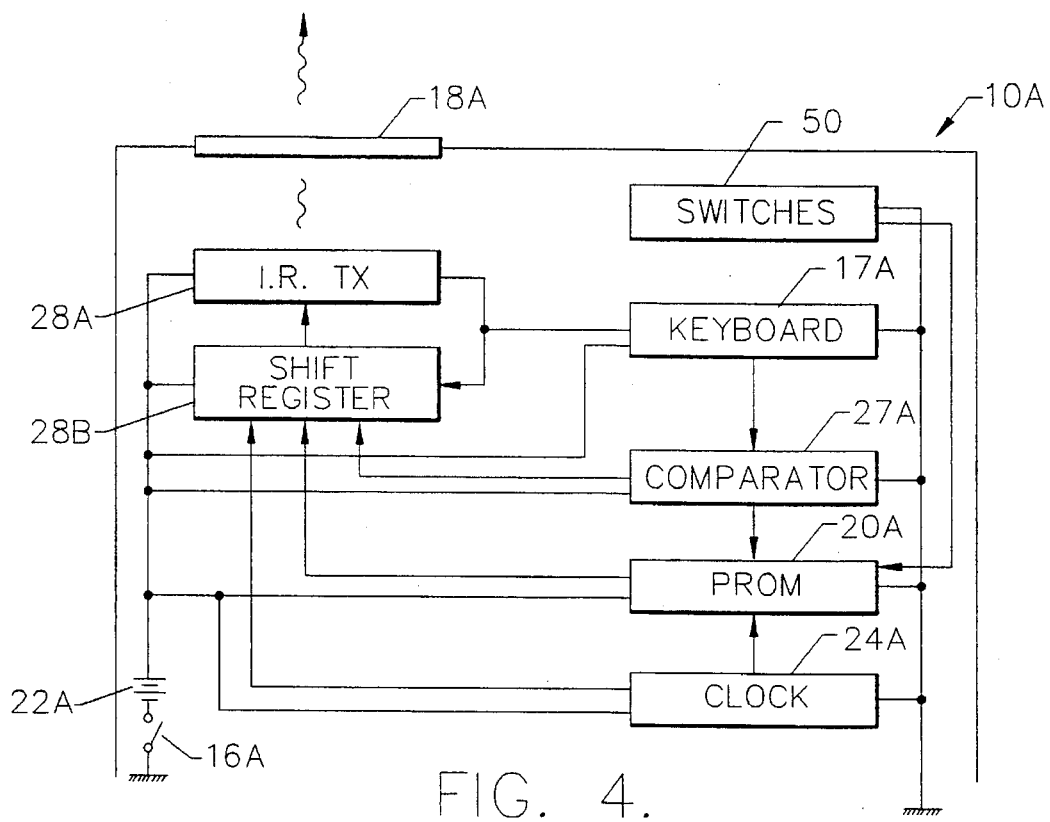
FIG. 4 is a schematic block diagram of the transmitter shown in FIG. 2.
Figure 7:
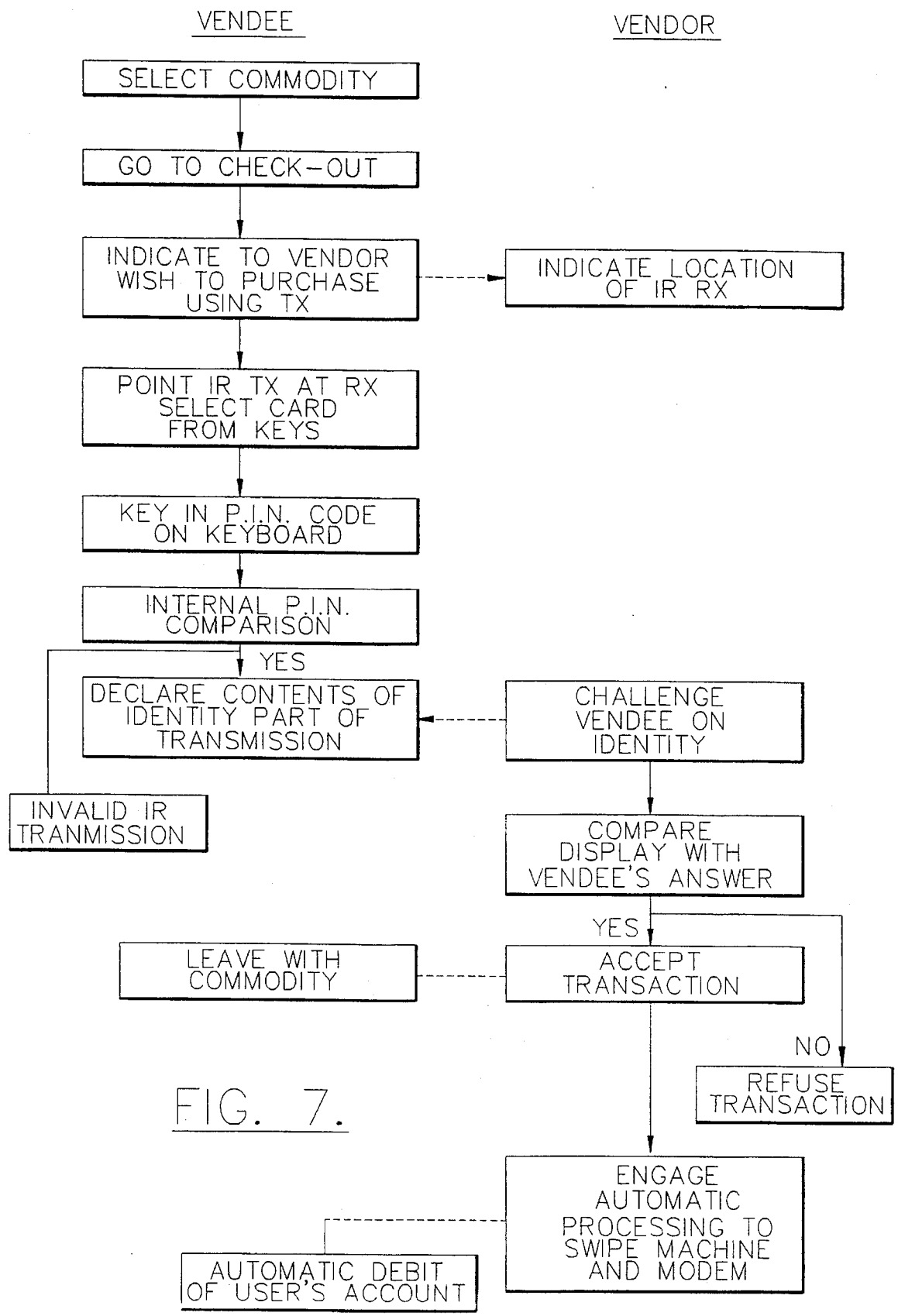
FIG. 7 and FIG. 8 depict flow charts which are similar to FIG. 6, but using the transmitters of FIG. 2 and FIG. 3 respectively.

Reference is now made to FIGS. 2, 4 and 7 of the accompanying drawings which describe a further embodiment of the invention. The transmitter 10a shown in FIG. 2 is similar to that shown in FIG. 1 in which like numerals denote like parts, but with the suffix 'a' added and which includes a facility for using the transmitter 10a with more than one credit card. This is achieved by providing a set of card select buttons 50, each of which can be selected by the user (step 3a, FIG. 7) in order to designate a particular transaction to a particular credit card. In this case, the individual owns several credit cards and wishes to have one transmitter to operate on behalf of all of the credit cards. Each card select button allows the operator to select the credit card which he wishes to use to complete the transaction. As shown in FIG. 4, the switches 50 are coupled to the PROM 20a and to the other components which contain the details appropriate to the card selected. Once the particular button has been depressed, the operation of the device is identical to that described with reference to FIG. 1.

Figure 5:
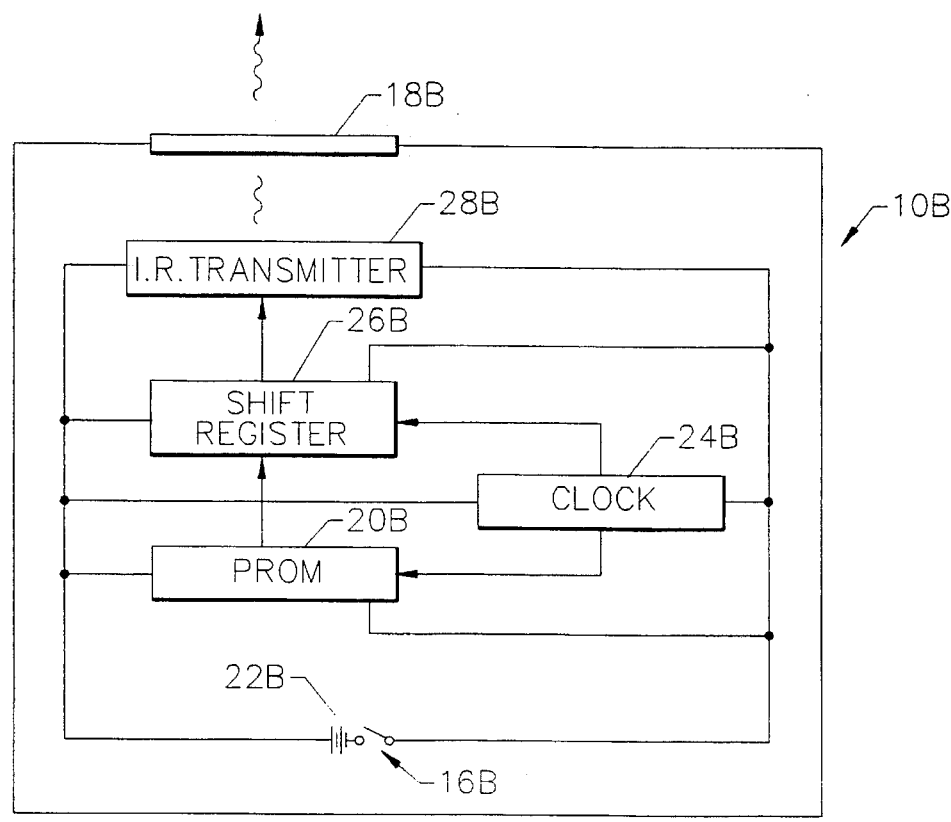
FIG. 5 is a schematic block diagram of an alternative transmitter similar to that of FIGS. 1 and 2, but which has no keypad.
Figure 9:
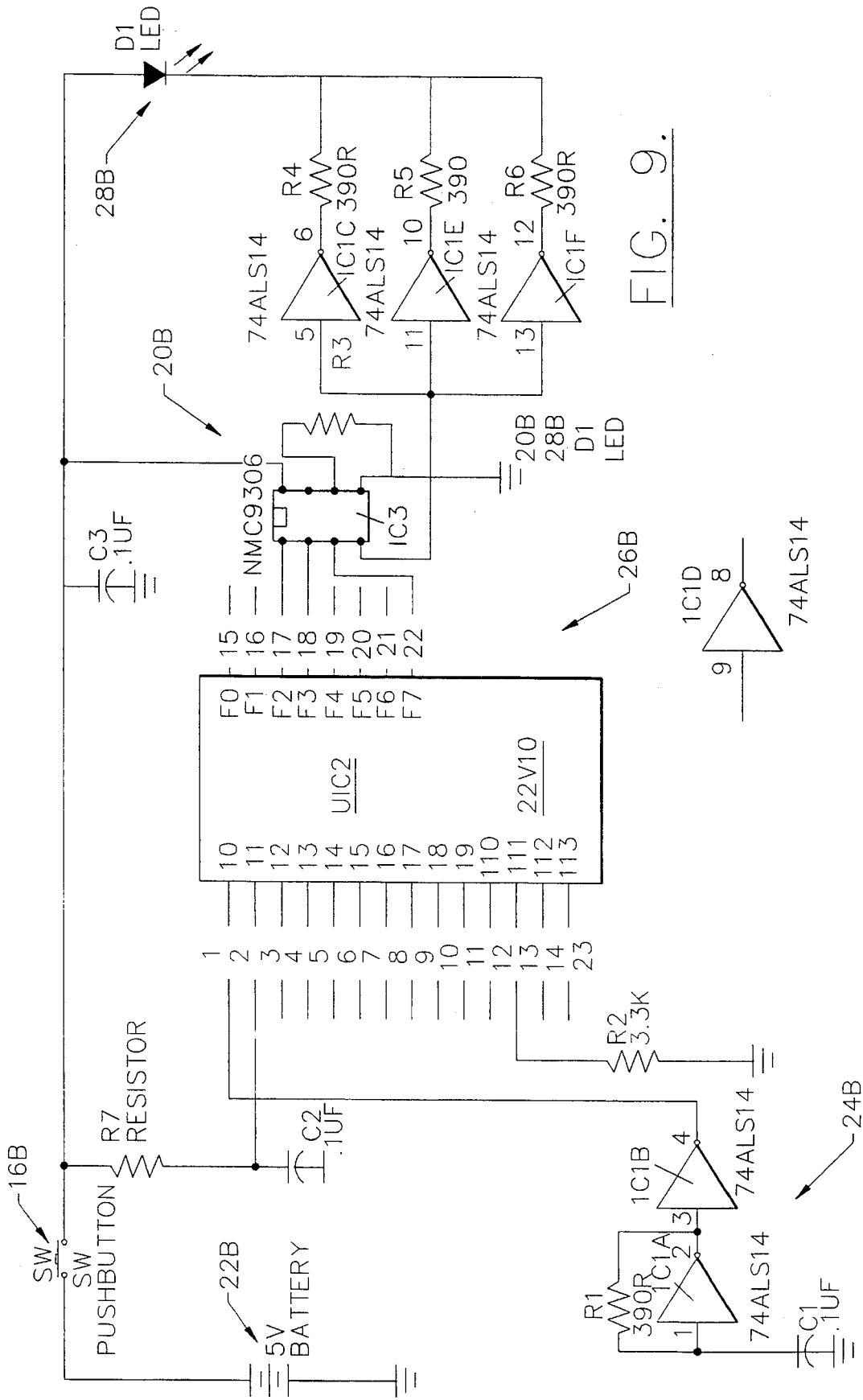
FIG. 9 is a circuit diagram of an embodiment of an infra-red transmitter in accordance with the present invention.

The device can be used for low value transactions such as paying parking charges, paying tolls and the like and as security codes are regularly updated any loss and unauthorised use is likely to be insignificant. Moreover, the transaction is likely to be fully mechanised for the vendor. Reference is now made to FIG. 5 of the accompanying drawings which are for a transmitter of generally similar size and shape to the transmitter 10 shown in FIG. 1 except that it does not have a key-pad. The circuit elements in FIG. 5 are referred to by like numerals, but by suffix 'b' added and operate in the same way. From FIG. 5 it will be seen that the basic operation is similar to the transmitter of FIG. 1 except that a PIN number is not employed. An example of how this circuit might be implemented is shown in FIG. 9. It comprises electronic elements where each and every one form part of the industry standard. ICs 1A and B might be a 74ALS14 or any suitable package containing 6 Schmitt trigger invertors; IC 2 is a 22V10 or any similar Programmable Array Logic configured to drive IC 3, an NMC9306, a 512-bit programmable serial read only memory. The resistors and capacitors are ¼ watt, 5 percent tolerance components; a nominal 6 volt battery is employed. The light emitting diode D1 is similar to those used in television channel changers. The user's credit card number and the encryption element are fused in IC 3. These data are configured in an auto-clocking code, a 3 from 9 code being an example, ready for transmission. Implementation might also employ micro-processors/micro-controllers to reduce the component count within the transmitter. There are many such devices available, an example being COP8720C, or a COP424C with an accompanying NMC9306.

The receiver might be configured round a bar-code reader. One example is the Hewlett-Packard HBCR8500 which contains all the necessary electronics to convert the data from the transmitter to ASC11, an international standard compatible with the majority of peripherals and swipe card machines.

Figure 8:
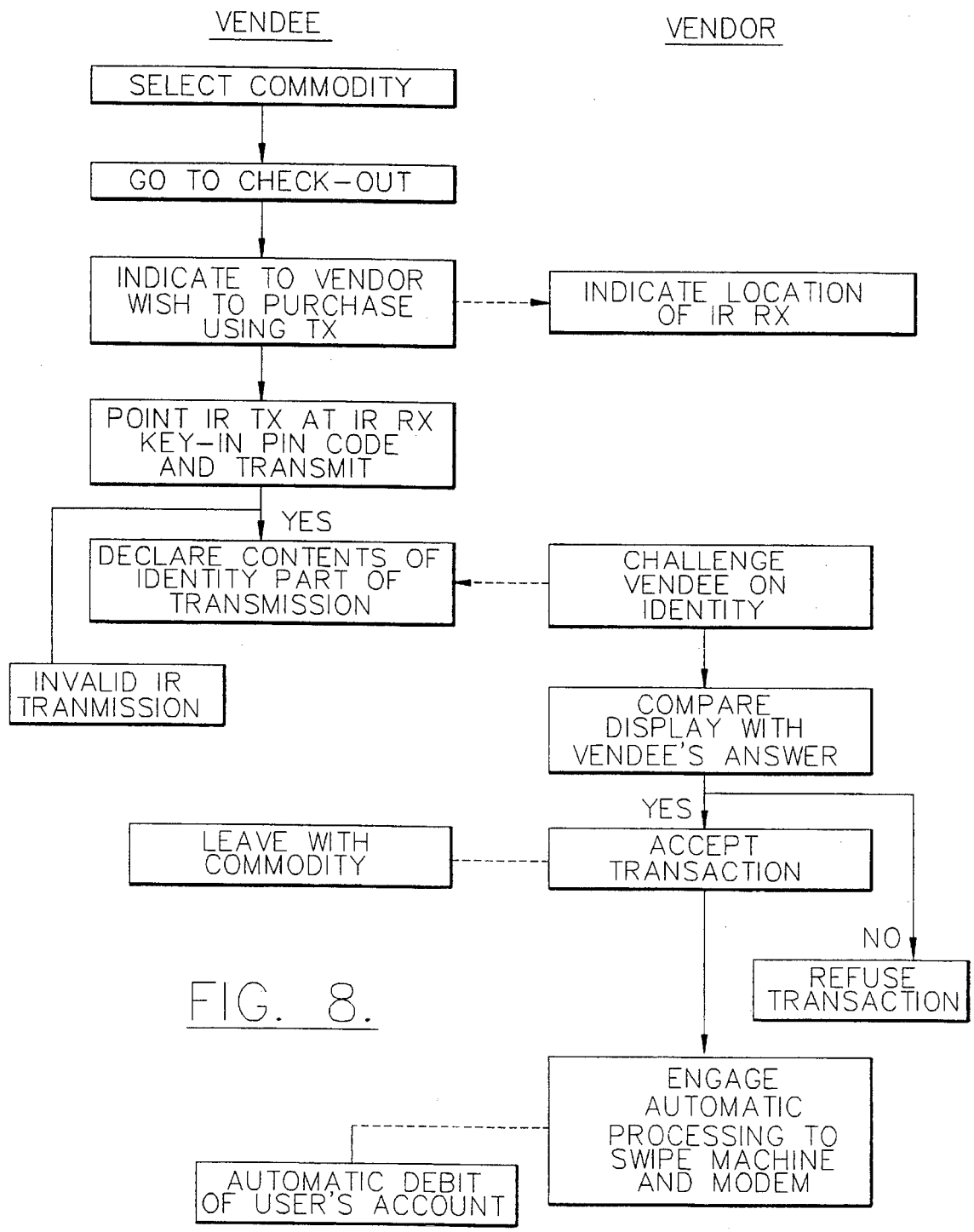

Reference is now made to FIGS. 5 and 8 of the accompanying drawings which are for a transmitter generally similar in size and shape to the transmitter 10 shown in FIG. 1 except that it does not have a keypad. The circuit elements in FIG. 5 are referred to by like numerals, but with the suffix 'b' added and operate in the same way. From FIGS. 5 and 8 it will be seen that the basic operation is similar to the transmitter of FIG. 1 except that a PIN number is not entered, that is, step 5 is omitted. This device can be used for low value transactions such as paying parking charges, paying tolls and the like and as the security codes are regularly updated any loss and unauthorised use is likely to be insignificant.

It will be appreciated that various modifications may be made to the embodiments hereinbefore described without departing from the scope of the invention. For example, two chips may be combined in a transmitter; one chip containing the user's credit information, PIN number and the like, and a second chip containing an encryption algorithm so that the data transmitted is encrypted for more secure communications. Each receiver would have a corresponding chip with a decryption algorithm so that the transmitted information can be decoded and the stored information displayed to the vendor. The size and shape of the transmitter may be varied and, in fact, depending on manufacturing technology, the transmitter may be credit card shaped to fit in a wallet or the like. The transmitter on such a credit card shape could also contain a keycard and credit card selector keys. The device and system could be used other than for financial transactions; it could be used to control entry or access to secure areas and the like, with the user's code (PIN) being verified at a local or central location.

The communication medium could be radio frequency (r.f.) sound or ultrasound suitable for carrying the necessary information to initiate a transaction, although it is believed that infra-red is the most suitable. A further modification is the addition of r.f. circuits to the transmitter and receiver so that the user is able to complete transactions remotely, in a similar manner to the operation of cardless cellular telephones. Thus, cinema theatre tickets and the like, could be ordered using the transmitter, and shopping could be done remotely with the receiver processing the order and automatically debiting the user's account.

The principal advantage of the invention is that it improves the security of cashless transactions and allows the transactions to be completed in a non-contacting fashion. Furthermore, it provides a more secure method of checking identity of the user without requiring signatures. In addition, a single transmitter can be used to complete transactions for various cards and the transactions can be performed for purchasing any type of goods or service, including parking, paying tolls and the like which is not hitherto been possible with existing credit cards.

We claim:

1. A non-contacting transaction system comprising,
transmitter means having a memory for storage of data identifying the user therein, and a wireless transmitter for transmitting the stored data to a remote location upon actuation of the transmitter means by the user, and
receiver means for receiving the transmitted data and also having indicator means for indicating that the data transmitted is received and that the transaction can proceed,
said transmitter means having no receiver to receive data from a remote location whereby said transmitter means only transmits data to said receiver means and said receiver means having no transmitter means for transmitting data to said transmitter means.

2. A system as claimed in claim 1 wherein the transmitter means includes a keypad for the user to insert details of a PIN number.

3. A system as claimed in claim 1 or claim 2 wherein the transmitter means includes a terminal coupled to said memory whereby the transmitter is coupled to a control means whereby the information in said memory is alterable.

4. A system as claimed in claim 2 wherein the transmitter includes a switch actuatable by the user which results in the stored data being continually transmitted or transmitted in bursts during the transmitting actuation.

5. A system as claimed in claim 1 wherein the receiver is coupled by a modem or the like over the telephone network to a central data processing and storage unit where details of the transactions are allocated to the user's account for subsequent billing.

6. A system has claimed in claim 1 wherein the receiver includes disk storage means or other suitable mass storage means for storing validated transactions for subsequent despatching of the stored transaction data to the central data processing and storage unit at a later date.

7. A system as claimed in claim 1 wherein the receiver includes a display for displaying to the vendor the transmitted information.

8. A system as claimed in claim 1 wherein the receiver includes parity and code check means for rectifying the correctness of the received code prior to transmitting it to the modem.

9. A transmitter for use in a non-contacting transaction system, said transmitter comprising a memory for storing data identifying the user, a data transmitter coupled to the memory for wireless transmission of said stored data to a remote location, and switch means actable by the user for causing said stored data to be transmitted, said transmitter having no receiver for receiving data from a remote location, whereby said transmitted only transmits data from said data transmitter to said receiver means.

10. A transmitter as claimed in claim 9 wherein the transmitter includes a keypad for the user to insert details of a personal identification number (PIN), and said data being transmitted only if the correct PIN number is keyed in.

11. A transmitter as claimed in claim 9 or claim 10 wherein the transmitter includes a terminal coupled to the memory whereby the transmitter can be coupled to a control means to change the information in said memory.

12. A transmitter as claimed in claim 9 wherein the transmitter includes a plurality of keys representative of different user accounts and the user can nominate which account a transaction is to be attributed to by selecting the appropriate key.

13. A transmitter as claimed in claim 9 wherein the transmitter is an infra-red transmitter.

14. A transmitter as claimed in claim 9 wherein the transmitter may include a remote telephone console interfaced to said memory and keys whereby a user may remotely conduct a transaction using radio frequency communications or any part of the electro-magnetic spectrum for communications.

15. A receiver for use in a non-contacting transaction system, said receiver comprising a data receiver for receiving a wireless transmission from a user actuated remote transmitter means, means for indicating that the data has been received, means for processing the received data for display, means for verifying the correctness of the data received, and display means for displaying to a vendor details of the user stored in said transmitter means, the receiver having no transmitter for transmitting data to said transmitter means, whereby the receiver receives wireless transmitted data only from said transmitter means.

16. A receiver as claimed in claim 15 wherein the receiver is coupled to a card swipe machine.

17. A receiver as claimed in claim 15 or 16 wherein the receiver and/or card swipe machine are coupled to a cellular telephone network for receiving said data by radio frequency communication.

18. A receiver as claimed in claim 15 wherein the receiver is coupled by a modem or the like over the telephone network to a central data processing and storage unit where details of the transactions are allocated to the user's account for subsequent billing.

19. A receiver as claimed in claim 15 wherein the receiver includes disk storage means or other suitable storage means for storing validated transactions for subsequent despatching of the stored transaction data to the central data processing and storage unit at a later date.

* * * * *